US010656258B2

(12) United States Patent
Lee et al.

(10) Patent No.: US 10,656,258 B2
(45) Date of Patent: May 19, 2020

(54) MEASUREMENT ACCURACY CLASSIFIER FOR HIGH-RESOLUTION RANGING

(71) Applicant: Greina Technologies, Inc., Salt Lake City, UT (US)

(72) Inventors: Daniel Joseph Lee, Salt Lake City, UT (US); Thomas Schmid, Salt Lake City, UT (US); Roy S. Shea, Salt Lake City, UT (US)

(73) Assignee: GREINA TECHNOLOGIES, INC., Salt Lake City, UT (US)

( * ) Notice: Subject to any disclaimer, the term of this patent is extended or adjusted under 35 U.S.C. 154(b) by 483 days.

(21) Appl. No.: 14/857,545

(22) Filed: Sep. 17, 2015

(65) Prior Publication Data

US 2016/0077204 A1 Mar. 17, 2016

Related U.S. Application Data

(60) Provisional application No. 62/051,836, filed on Sep. 17, 2014.

(51) Int. Cl.
*G01S 13/46* (2006.01)
*G01S 13/00* (2006.01)

(52) U.S. Cl.
CPC ............ *G01S 13/46* (2013.01); *G01S 13/003* (2013.01); *G01S 2013/462* (2013.01); *G01S 2013/466* (2013.01)

(58) Field of Classification Search
CPC ........ G01S 13/10; G01S 13/103; G01S 13/24; G01S 13/34; G01S 13/36; G01S 13/38;
(Continued)

(56) References Cited

U.S. PATENT DOCUMENTS 5,517,196 A * 5/1996 Pakett ..................... G01S 13/52
342/70
7,428,270 B1 9/2008 Dubuc et al.
(Continued)

FOREIGN PATENT DOCUMENTS

WO WO 199602006 1/1996

OTHER PUBLICATIONS

International Search Report and Written Opinion for International Application No. PCT/US15/50751 dated Dec. 18, 2015.

*Primary Examiner* — Peter M Bythrow
(74) *Attorney, Agent, or Firm* — Workman Nydegger

(57) ABSTRACT

A system is provided with a ranging transmitter and receiver pair or a transceiver pair. The system classifies a group of radio frequency (RF) channels between ranging transmitter and receiver pairs. In a first scenario, a ranging transmitter transmits at least three channels to an active reflecting receiver. A ranging receiver then receives reflected instances of the at least three transmitted channels from the active reflecting receiver. A processor of the system then determines a ranging measurement between the ranging transmitter and the active reflecting receiver based on measured phase changes and received signal strength and assigns a classification to the determined ranging measurement indicating a relative level of accuracy for the determined ranging measurement. The classification may be a general classification, a linearity classification, a multipath classification, or a combination classification that is based on both a linearity classification and a multipath classification.

19 Claims, 7 Drawing Sheets

(58) Field of Classification Search
CPC .......... G01S 13/84; G01S 19/43; G01S 13/08; G01S 13/106; G01S 13/12; G01S 13/18; G01S 13/20; G01S 2013/462; G01S 2013/466; G01S 13/75; G01S 13/751; G01S 13/753; G01S 13/758; G01S 13/785; G01S 13/787; G01S 13/788; G01S 13/82; G01S 13/825

See application file for complete search history.

(56) References Cited

U.S. PATENT DOCUMENTS

| | | | |
|---|---|---|---|
| 2006/0107307 A1* | 5/2006 | Knox | H04L 63/0492 726/2 |
| 2008/0133126 A1* | 6/2008 | Dupray | G01S 5/0018 701/408 |
| 2008/0150699 A1* | 6/2008 | Ohara | G01S 13/84 340/10.4 |
| 2008/0187032 A1 | 8/2008 | Pande et al. | |
| 2010/0241378 A1* | 9/2010 | Baraniuk | H03L 7/07 702/66 |
| 2010/0277360 A1* | 11/2010 | Lee | G01S 5/0289 342/125 |
| 2010/0309051 A1 | 12/2010 | Moshfeghi | |
| 2011/0111751 A1* | 5/2011 | Markhovsky | G01S 3/74 455/423 |
| 2012/0032855 A1 | 2/2012 | Reede et al. | |
| 2014/0232588 A1 | 8/2014 | Lee | |
| 2015/0256972 A1* | 9/2015 | Markhovsky | H04W 4/90 455/456.1 |
| 2016/0195484 A1* | 7/2016 | Emery | G01R 27/14 702/65 |

* cited by examiner

MEASUREMENT ACCURACY CLASSIFIER FOR HIGH-RESOLUTION RANGING

CROSS-REFERENCE TO RELATED APPLICATIONS

This application claims priority to and the benefit of U.S. Provisional Patent Application Ser. No. 62/051,836, entitled "Measurement Accuracy Classifier for High-Resolution Ranging," filed on Sep. 17, 2014, which application is incorporated by reference herein in its entirety.

BACKGROUND OF THE INVENTION

1. The Field of the Invention

Embodiments of the present invention relate to device localization.

2. Background and Related Art

Ranging, or the measurement of distance, through the use of phase measurements on radio frequency signals transmitted between two points in space is a well-known method of determining distance between two points. Given that simultaneous transmission and reception on the same carrier frequency is not possible because of mutual interference, transmission of radio frequency signals on path AB between stations A and B requires the use of a different carrier frequency for the return on the path BA.

Thus, such a distance measuring system requires two simultaneously occupied transmission channels and transmitters and receivers on two different frequencies. Such two frequency systems make inefficient use of the available ratio frequency spectrum. In addition, noise on either frequency may interfere with the process.

Ranging effected by measuring the phase of signals sent from point A, to point B, and back to point A is a well-established technology. For example. U.S. Pat. No. 3,243,812 to Williams discloses a system of phase measurement for determining distance. U.S. Pat. No. 4,170,773 to Fitzsimmons, et al. also discloses a method for determining distance by comparing the phase of a transmitted signal with one transponded by a distant device.

Such prior art systems require transmission and reception simultaneously on two different frequencies. Phase measurements are made only at the interrogator using a single phase reference source, and the interrogator and receiver hardware perform different functions. The interrogator contains the source of the signal sent around the loop from interrogator to transponder and back, as well as the measurement apparatus for determining the relative phase between the transmitted signal and the received signal. The transponder functions merely to receive the ranging signal and to retransmit it with minimum, but known, delay or delay variation.

One limitation on the use of such prior art ranging systems is the requirement for transmission and reception to occur simultaneously at both stations, thus requiring clear channel operation on two different transmit frequencies at the same time. Moreover, the range measuring circuits in such systems are started and stopped by reference marker clock signals which are transmitted from each station. The range calculation is dependent upon the reference clocks being synchronized or locked to each other, and significant range errors will be produced if the clocks are not maintained in close synchronism.

Still further, regardless of which ranging systems or methods are used, determined range distances are prone to error. The error is caused by an array of different factors based on environment, equipment used and other conditions. Users have no way of knowing how accurate a given ranging system is or, more specifically, how accurate the ranging system is in a given environment.

BRIEF DESCRIPTION OF THE INVENTION

In one embodiment, a system is provided with a ranging transmitter and receiver pair or a transceiver pair. At the system, various methods may be performed including a method for classifying a group of radio frequency (RF) channels between one or more ranging transmitter and receiver pairs.

In a first embodiment, a ranging transmitter transmits at least three channels to an active reflecting receiver. A ranging receiver then receives reflected instances of the at least three transmitted channels from the active reflecting receiver. A processor of the system then determines a ranging measurement between the ranging transmitter and the active reflecting receiver based on measured phase changes and received signal strength and assigns a classification to the determined ranging measurement indicating a relative level of accuracy for the determined ranging measurement.

In a second embodiment, a ranging transmitter transmits at least three channels to an active reflecting receiver. A ranging receiver then receives reflected instances of the at least three transmitted channels from the active reflecting receiver. A processor of the system then determines a ranging measurement between the ranging transmitter and the active reflecting receiver based on measured phase changes and received signal strength. The processor further plots phase measurements of the reflected instances of the at least three channels for each frequency of the at least three channels, determines a degree of linearity for the plotted phase measurements at the specified frequencies and assigns a linearity classification to the determined ranging measurement based on the determined degree of linearity between the phase and frequency of the at least three channels, where the linearity classification indicates a relative level of accuracy for the determined ranging measurement.

In a third embodiment, a ranging transmitter transmits at least three channels to an active reflecting receiver. A ranging receiver then receives reflected instances of the at least three transmitted channels from the active reflecting receiver. A processor of the system then determines a ranging measurement between the ranging transmitter and the active reflecting receiver based on measured phase changes and received signal strength. The processor further performs a Fast Fourier Transform (FFT) on the phase change measurements to extract frequency components from the measured phases. The frequency components indicate a channel path length between the transmitter and the active reflecting receiver. The processor further assigns a multipath classification to the determined ranging measurement based on the channel path length indicated by the frequency components, where the multipath classification indicates a relative level of accuracy for the determined ranging measurement.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION OF THE PREFERRED EMBODIMENTS

Figure 1:
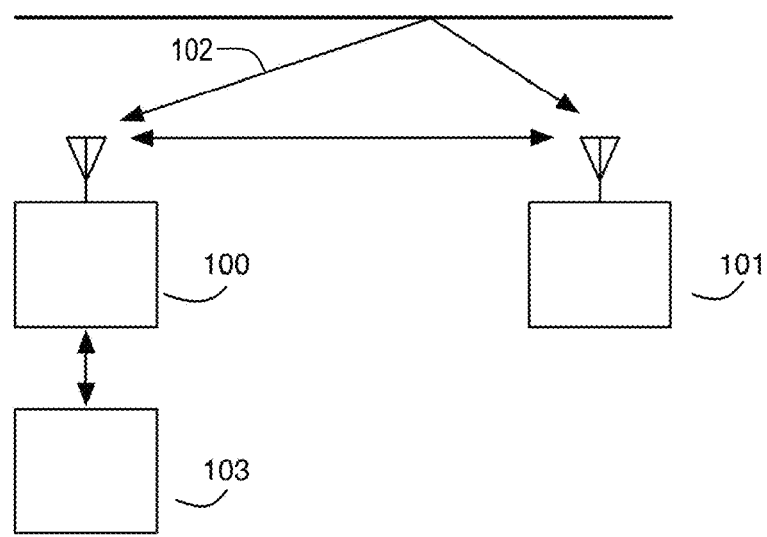
FIG. 1 illustrates a block diagram of a system of radios with initiating and active reflecting systems, a radio channel, and a processing unit.

A low cost radio device that is used to measure the distance and location of objects and/or the motion of objects based on narrow-band signals that may include, but are not limited to, acoustic signals, RF signals, sonar signals, or the like or combinations thereof.

The distance may be measured in a variety of different ways. For example, an active reflector radio frequency ranging system may be provided for high-resolution ranging which includes at least two radio frequency transceivers. One of the transceivers, acting as a master unit, transmits a radio frequency signal burst to at least one other designated transceiver which acts as a slave unit and active reflector. The slave unit, actively matches the phase and frequency of the incoming signal and retransmits a signal at the matched phase and frequency. The slave can retain the phase and frequency data that it receives for some time before retransmitting the signal to the master. Within a network, master and slave designations are arbitrary, as those roles can be temporarily assigned as required. In fact, any unit that initiates a ranging operation is, by definition, a master unit. Each transceiver unit, or node, may be assigned a unique address. As the system supports a master with multiple slaves, point-to-point ranging, as well as point-to-multipoint ranging are enabled.

In one embodiment, a first unit of the high-resolution ranging system (the acting master) transmits a radio signal burst asking for a ranging measurement. A second unit (the acting slave) determines, either by default or by decoding a read range data packet, that it is the unit from which the acting master is requesting the ranging measurement. Following a positive determination, the acting slave measures phase and frequency drift of the incoming carrier wave and aligns the its own oscillator, or clock, so as to achieve commonality of frequency and phase coherence with the incoming signal. Accuracy of oscillator alignment within the slave unit can be enhanced by transmitting multiple packets. The slave extracts phase and frequency data from each packet and averages the results: The more packets that are received over time, the more accurate the calculation of the phase and frequency of the incoming carrier and the readjusting of the slave's internal clock.

In some cases, an adaptive loop is employed to measure the phase of random incoming packets from the master and adjust the slave unit's oscillator so that it is phase coherent with the master unit's oscillator. As with much of the prior art, no continuous wave transmission is required. In fact, the incoming RF signal can transmit multiple packets over multiple frequencies during different periods of time. The preferred embodiment of the invention also incorporates a delta sigma phase lock loop, which maintains phase coherency of the of the slave unit's oscillator with the incoming signal, regardless of its frequency. Software onboard the slave unit is used to process incoming signal information and reconstruct it in order to maintain phase lock of the slave unit's oscillator with that of the master. This feature facilitates the implementation of frequency hopping, which is instrumental in determining measurement of absolute distances between master and slave units.

When the master unit transmits a radio frequency burst at a particular frequency to a slave unit, the signal is received by the slave unit, mixed with at least one local oscillator signal to create an error signal, which is fed to a digital control system consisting of a central processing unit or state machine. The output from the digital control system is fed to the reference oscillator, which controls the delta sigma phase lock loop, which in turn, controls the local oscillator. Because the individual bursts may be too short to generate an accurate determination of phase and frequency error, several bursts may be required to achieve optimum lock-on of the slave unit's reference oscillator. Thus, the TIRO (Thermally insulated reference oscillator) retains the incoming phase and frequency information so that no matter on which channel the phase lock loop (PLL) is initially set, it derives its phase information from the reference oscillator. Thus, as the TIRO sets the phase and frequency of the PLL, the TIRO also effectively sets the frequency of the slave unit's transmitter and local oscillator.

There are two major problems associated with divide-by-integer phase lock loops. The first is that if sufficient bandwidth is allocated to the low-pass filter for a required modulation range, there is insufficient step resolution for both frequency generation and frequency modulation. The second is that if smaller frequency steps are utilized, there is insufficient band width at the low-pass filter. Fractional phase lock loops (also known as delta sigma phase lock loops (PLLs)) were developed to solve precisely these problems.

For example, in one embodiment, the fractional PLL generates 64 clock cycle phase relations (diffs) of the local oscillator for each cycle of the 16 MHz reference oscillator. However, when a fractional PLL is used, the wave form edges of the generated signal may not directly align with the reference oscillator. This is especially problematic in a ranging system where synchronicity of phase relationship between transmitted and received signals is essential for meaningful distance measurements. In addition, if burst-mode operation or frequency-hopping is envisioned, or if the local oscillator—for the sake of circuit simplicity and minimal power consumption—is shared between transmit and receive functions, it is essential that the phase relationship between the transmitted and the received signal be establishable at all times.

Embodiments described herein may employ a phase relationship counter, which keeps track of the fractional time frames of the fractional phase lock loop as a function of the reference oscillator. The phase relationship counter provides absolute phase information for an incoming burst on any channel within the broadcast/receive band, thereby enabling the system to almost instantaneously establish or reestablish the phase relationship of the local oscillator so that it synchronized with the reference oscillator. The phase relationship counter, coupled with a thermally-insulated reference oscillator that ensures synchronicity of master and slave reference oscillators with negligible drift over short periods of time, allows the system to: minimize power consumption by cutting power to all but the reference oscillator and phase-relationship counter when it is not receiving or transmitting signals; utilize a common voltage-controlled local oscillator for both receive and transmit operations; and maintain predictable phase relationships between the local oscillator and the received signal for both discontinuous bursts at the same frequency and bursts at different frequencies (frequency hopping).

Frequency hopping greatly enhances the usefulness of the system, as noisy channels can be avoided and the presence of multipath transmissions can be detected and eliminated from ranging calculations. Frequency hopping can be used with any radio technology where adequate bandwidth is provided.

The radio transceivers used to implement the present invention employ quadrature phase modulation (QPM). Like all modulation schemes, QPM conveys data by changing some aspect of a carrier signal, or the carrier wave, (usually a sinusoid) in response to a data signal. In the case of QPM, the phase of the carrier is modulated to represent the data signal. Although the invention can be implemented by calculating the phase shift of incoming data packets, it can also be implemented by demodulating the phase shift of the QPM data packets and using the resulting data to calculate range.

Vernier measurement techniques can be employed to enhance the accuracy of distance calculations for the present invention. Although vernier measurement has been used in FM radar systems for at least fifty years, those systems typically relied on the simultaneous transmission to two or three signals at different frequencies. The present invention, on the other hand, is unique in that vernier measurement can be implemented using randomly-selected frequencies within randomly-selected channels, which are transmitted during randomly-selected time intervals. This is because the phase relationship counter associated with the slave unit's fractional phase lock loop allows the phase relationship of any received signal to be established as a function of the slave reference oscillator which, for relatively short periods of time, can be considered synchronous with the master reference oscillator.

Vernier measurements are made in the following manner: at least two signals, which are in phase at the point of transmission, are transmitted on different frequencies. A course measurement of distance can be made by measuring the phase difference between the signals. Two frequencies suffice if they will not share a common null point over the measured distance. For two-signal measurement, the bandwidth required depends on how accurately phase difference between the two signals can be measured. If measurement accuracy is 3 degrees, then bandwidth can be 0.833 percent of a 400 MHz band, which is a 3.33 MHz-wide band, or two channels that are 3.33 MHz apart. If measurement accuracy is 1 degree, then bandwidth can be 0.277 percent, or 1.11 MHz of the same band. Vernier ranging can be easily implemented on the band specified for wireless personal area network (WPAN) in North America under IEEE specification 802.15.4-2006, as it provides for thirty channels within a bandwidth of 902-928 MHz. If resolution of the receiver is less than 1 wave length, phase of a received signal can be measured.

A coarse measurement provides the number of wavelengths from the transmitter. By calculating absolute phase of the received signals, a fraction of a wavelength can then be added to the number of wavelengths from the transmitter for a more accurate calculation of range. In accordance with the present invention, it is possible to build a radio which can resolve the phase of received signals down to as little as 0.1 degree. With such a radio, phase differences between two adjacent frequencies within a narrow band can be easily resolved. In a band having a wavelength of 12 cm, theoretical resolution for ranging measurements can be better than 0.005 cm.

As previously stated, two frequencies can be used for ranging calculations up to a distance where the first null point occurs (i.e., both frequencies once again are momentarily in phase with one another. Two radio signals at different frequencies will, at some distance from the source, eventually null each other out, thereby making measurements beyond that point ambiguous. Thus, at least three frequencies are required to avoid ambiguous measurements. It is particularly helpful if the third frequency and one of the other two frequencies do not possess a divide by n relationship. Because the ranging system of the present invention utilizes a fractional phase lock loop with a phase relationship counter, random frequency hopping can be employed. When operating in the 902-928 MHz band, for example, the present invention can randomly employ any three or more of the 30 channels over time.

A major advantage of the present invention is that it addresses ranging inaccuracies caused by multipath transmissions. Although a multi-frequency ranging system works well if transmissions are made through a conductor or with a laser, a radio transmission through space generally results in reflections of the transmitted wave front, resulting in multipath transmission paths. As any path other than a straight line between the transmission and reception points is necessarily of greater distance, the signal which provides the correct phase shift for accurate ranging will be accompanied by signals that have traveled greater distances and which, therefore, display increased amounts of phase shift.

The ranging systems constructed in accordance with the present invention transmit at least three radio signals at different frequencies and compare the distance-phase relationship between the different frequencies. The ranging system of the present invention utilizes a frequency-hopping approach to identify multipaths, select the shortest path, and calculate the distance of the shortest path. This is uniquely accomplished by constructing a table of measured phase and amplitude vs. frequency for at least three frequencies, which can be randomly selected in order both to avoid noisy channels and utilize only a small portion of available bandwidth at a given time.

An analog-to-digital converter inputs phase-amplitude data into the table in frequency order. This data is subjected to a Fourier transform, preferably using a computer system to perform the calculations. The resulting beat-frequency peaks correspond to the various detected paths. The path having the lowest beat frequency is the shortest and actual distance between the system master and slave units. Using digital signal processing, if an inverse Fourier transform is performed on the Fourier transform data, the inverse Fourier transform data can be used to calculate changes in the phase relationships for different frequencies, and correct for distortion caused by multiple reflective paths as the master and slave units move with respect to one another.

Vernier distance measurement and multi-path detection and correction work in concert. The process is performed using the following sequence of steps. Firstly, using frequency hopping involving at least frequencies f1, f2 and f3, phase differences between the various frequency pairs (i.e., between f1 and f2, f1 and f3, and f2 and f3) are determined. Secondly, multipath correction is performed to eliminate multipath data and determine the integer number of wavelengths at one of those frequencies that separate the master and slave unit antennas for the shortest path. Thirdly, the system switches to a phase accumulation mode and calculates the absolute phase of each received frequency, thereby providing data for calculation of a partial wavelength that must be added to the integer number of wavelengths distance for an accurate measurement.

Thus, the ranging system for the present invention provides high resolution range measurements with low bandwidth utilization. Although the transmission of multiple frequencies is required for the initial distance calculation, as long as the object doesn't move more than one-half wavelength between measurement calculations, it can be tracked with a single frequency. In a gaming system, for example, the use of a single frequency between antenna pairs once position acquisition is achieved will greatly reduce computational overhead.

It is useful to know how accurate a measurement of distance is. This is usually provided with an estimated standard deviation. However, this standard deviation is often based on the statistics and probabilities of multiple ranging measurements, where the distribution may be Gaussian.

Embodiments of the invention include a novel approach to provide greater insight into each and every ranging measurement using high-accuracy ranging methods as described in, by way of example, U.S. Pat. No. 8,274,426 (which is incorporated by reference herein). In one embodiment, each ranging measurement gets classified according to the channel the measurement was made with. This classification provides greater insight into the accuracy of the measurement. For example, using the embodiments herein, a user can now say that if the classification is <10 (on a scale of 1-100), there is a 99% accuracy of the measured distance being accurate to within 10 cm. However, with a classification of >40, the ranging system would have an accuracy of +/−4 meters. This is useful in applications where different accuracy levels are permissible, or where only very high accuracies are necessary and thus bad classification measurements can simply be ignored.

In one example where two or more devices conduct or participate in a ranging procedure, at least one of the devices is an active reflector. The devices hop over multiple frequencies, where the first device sends out a constant carrier wave, and the second device actively reflects that wave back to the first one. The first device then measures the phase different between the local oscillator and the received constant wave, and deduces a phase difference between them. At the same time, the unit measures the received signal strength which will be used in calculating the total energy in the overall received signals.

FIG. 1 shows an embodiment of a high-resolution ranging system. The system includes radios with initiating [100] and active reflecting [101] units and a radio channel [102]. A processing unit [103] makes classifications of the channel [102] and improves the ranging procedure.

Figure 2:
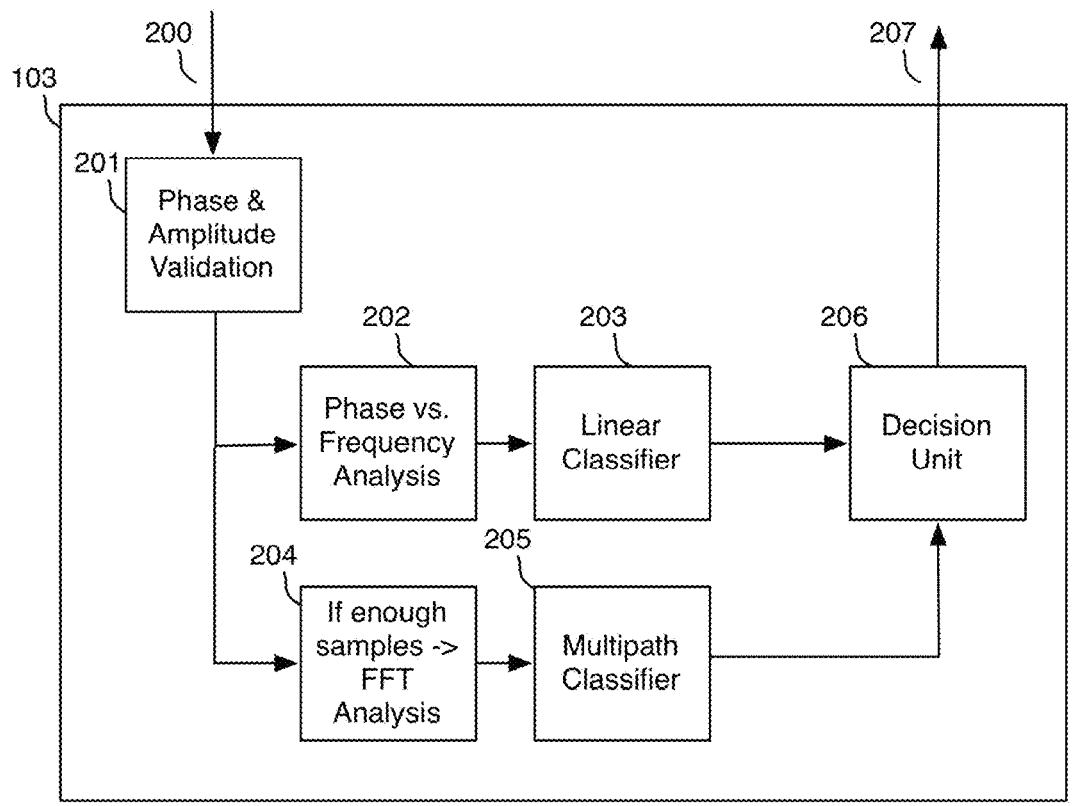
FIG. 2 illustrates a block diagram of an embodiment of the processing unit including linear and multipath classifiers.

FIG. 2 illustrates a block diagram 200 of one embodiment of the processing unit [103]. After validating the phase and amplitude [201], two classifiers [202,203] and [204,205] operate in parallel before a decision and fusion unit [206] combines the result and optimizes the ranging procedure. The block diagram 200 illustrates various components and method steps that are implemented and performed when classifying a group of RF channels between one or more ranging transmitter and receiver pairs.

In one embodiment, a ranging transmitter (e.g. 100) transmits at least three channels to an active reflecting receiver (e.g. 101). A ranging receiver (e.g. 100) then receives reflected instances of the at least three transmitted channels 102 from the active reflecting receiver. A processor 103 of the system then determines a ranging measurement between the ranging transmitter and the active reflecting receiver based on measured phase changes and received signal strength and assigns a classification to the determined ranging measurement indicating a relative level of accuracy for the determined ranging measurement. Although many embodiments herein are described as using three frequencies, it will be understood that substantially any number of frequencies may be used. The frequencies may be drawn from a specified pool of frequencies that are available for use. In some cases, continuous signals may be used from the pool of frequencies, while in other cases, the transmitter may be configured to hop between many different frequencies selected from the pool of frequencies.

In some embodiments, as will be described further below, wherein the assigned classification is a linearity classification. The linearity classification may be determined by plotting phase measurements of the reflected instances of the at least three channels for each frequency of the at least three channels. Thus, as shown in FIG. 6, the phase measurements may be substantially linear when plotted vs. frequency. The degree of linearity for the plotted phase measurements may be determined using a least squares method or a line fitting method.

Another type of classification may also be used in addition to, or as an alternative to the linearity classification. For example, the assigned classification may be a multipath classification, where the multipath classification is determined by performing a Fast Fourier Transform (FFT) on the phase change measurements to extract various frequency components from the measured phases. The frequency components indicate a channel path length between the transmitter and the active reflecting receiver.

The change in phase difference versus the transmitted frequency can be used to calculate the absolute distance between the two devices. If the conditions of the communication channel are good, for example in direct line of sight without any reflectors nearby, the measured phase should monotonically increase or decrease. An example of this is depicted in FIG. 6. But if the channel consists of the combination of multiple paths, e.g. if the radio wave reflects from a wall or other metal surface, then the measured phases won't be a straight line, as it now is a combination of different signals. Here, the ranging system can extract the different signals from the measured phases by taking the FFT of it, as depicted on FIG. 7. The FFT extracts the different frequency components that are comprised in the measured phases. These different frequency components directly correspond to the different path lengths.

In some embodiments, the assigned classification may be based on both a linearity classification and a multipath classification. For example, if the multipath classifier indicates that there is one peak, the ranging system can look at the linear classifier to confirm. Alternatively, if the multipath classifier indicates that there are five peaks (i.e. five potential transmission paths), the linear classifier may be used to identify the correct path. In most cases, the shortest distance path will be the correct path.

Whether the classification is a linearity classification, a multipath classification, or simply a generic classification, a numerical or other scale may be used to indicate whether a ranging distance accurate or inaccurate, and to what degree. For instance, a numerical scale may be implemented where a one indicates that the classification is highly accurate and where 100 indicates that the classification is highly inaccurate. Other scales may be also be used to show a level of accuracy for a given ranging distance.

As shown in FIG. 2, a phase and amplitude validation 201 may be performed on the reflected instances of the at least three channels received from the active reflecting receiver to measure phase changes and received signal strength in the at least three channels. These measured phase changes and signal strengths may be used by the processor when determining the ranging measurement between the ranging transmitter 100 and the active reflecting receiver 101.

Once a classification has been assigned, it may be used to refine the number of channels and measurements taken at each channel to improve measurement frequency in good channels by removing unnecessary channels, or to improve accuracy in bad channels by adding measurements.

One embodiment of the invention relates to the analysis and classification of this received signal, and the deduction of a quality figure. An example device may include two different classifiers, one for a good, single path signal (the Linearity Classifier [203]) and the Multipath Classifier [205] shown in FIG. 2.

Linearity Classifier

Figure 3:
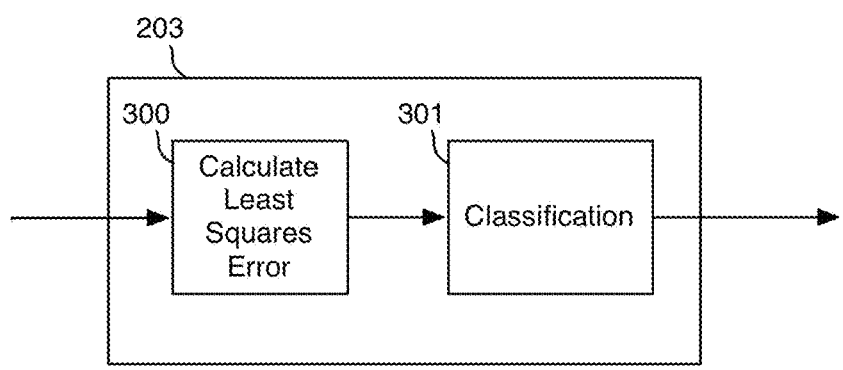
FIG. 3 illustrates an embodiment of a linear classifier that calculates the linearity of the measured phases vs. frequency.

FIG. 3 illustrates an embodiment of the linear classifier [203] that calculates the linearity of the measured phases vs. frequency [300]. In one embodiment, a Least Squares Error may be used to determine overall linearity, but other mathematical tools are available for similar results.

One embodiment in which a linearity classification is implemented includes the following method: a ranging transmitter transmits at least three channels to an active reflecting receiver. A ranging receiver then receives reflected instances of the at least three transmitted channels from the active reflecting receiver. A processor of the system then determines a ranging measurement between the ranging transmitter and the active reflecting receiver based on measured phase changes and received signal strength. The processor further plots phase measurements of the reflected instances of the at least three channels for each frequency of the at least three channels, determines a degree of linearity for the plotted phase measurements at the specified frequencies and assigns a linearity classification to the determined ranging measurement based on the determined degree of linearity between the phase and frequency of the at least three channels, where the linearity classification indicates a relative level of accuracy for the determined ranging measurement.

The linearity classifier works on the principle of how linear the measured phase vs. frequency is. This can be accomplished with a multitude of different mathematical algorithms, like the Minimum Least Squares (MLS) method. The input to the MLS algorithm are pairs of X/Y numbers, where X is the frequency, and Y the phase measured at that frequency. The output of the MLS algorithm is the linear approximation that fits the given pairs by minimizing the least squares error, plus the average least squares error achieved. This average error can then be used to classify the measurement. For example, if the least squares error is low, the measurement would be classified as very good. However, if the error is larger, the classification of the measurement would be worse. This information is important to higher level localization algorithms that use, for example, a trilateration approach based on non-linear optimization. The classification can be used to properly weight the different measurements, and thus can find an improved location of the object.

The transmitter 100 may implement multiple phase measurement samples at each frequency. For example, the transmitter may transmit ten phase measurement samples at a first frequency and store the phase measurement results for that frequency. The transmitter may then transmit ten phase measurement samples at a second frequency and store the phase measurement results for that frequency. This may continue until the three or more frequencies have been tested. Thus, in such cases, a minimum of 30 samples would be collected if three frequencies were used. The processor 103 may then determine the variance in the phase measurement samples for each frequency (in each of the ten samples in the example above). A high variance would indicate that the phase measurements at that frequency are inaccurate, while a low variance would indicate that the phase measurements at that frequency are most likely accurate. Once the minimum number of samples have been taken, MLS, line fit or other methods may be used to find the linearity of the measured points.

Indeed, it will be understood by those having skill in the art that MLS is only one way of finding the linearity of the measured points. There are other mathematical tools that could be used. The main idea is to classify the linearity using one of these tools, so that the classification can be used in higher level algorithms to improve accuracy.

Multipath Classifier

The Linearity Classifier fails if the measured signal consists of multiple paths. In the case of the multipath classifier, the measured phases will be far from a linear line, and thus the classification won't work well. An example of this can be seen on FIG. 7.

Figure 4:
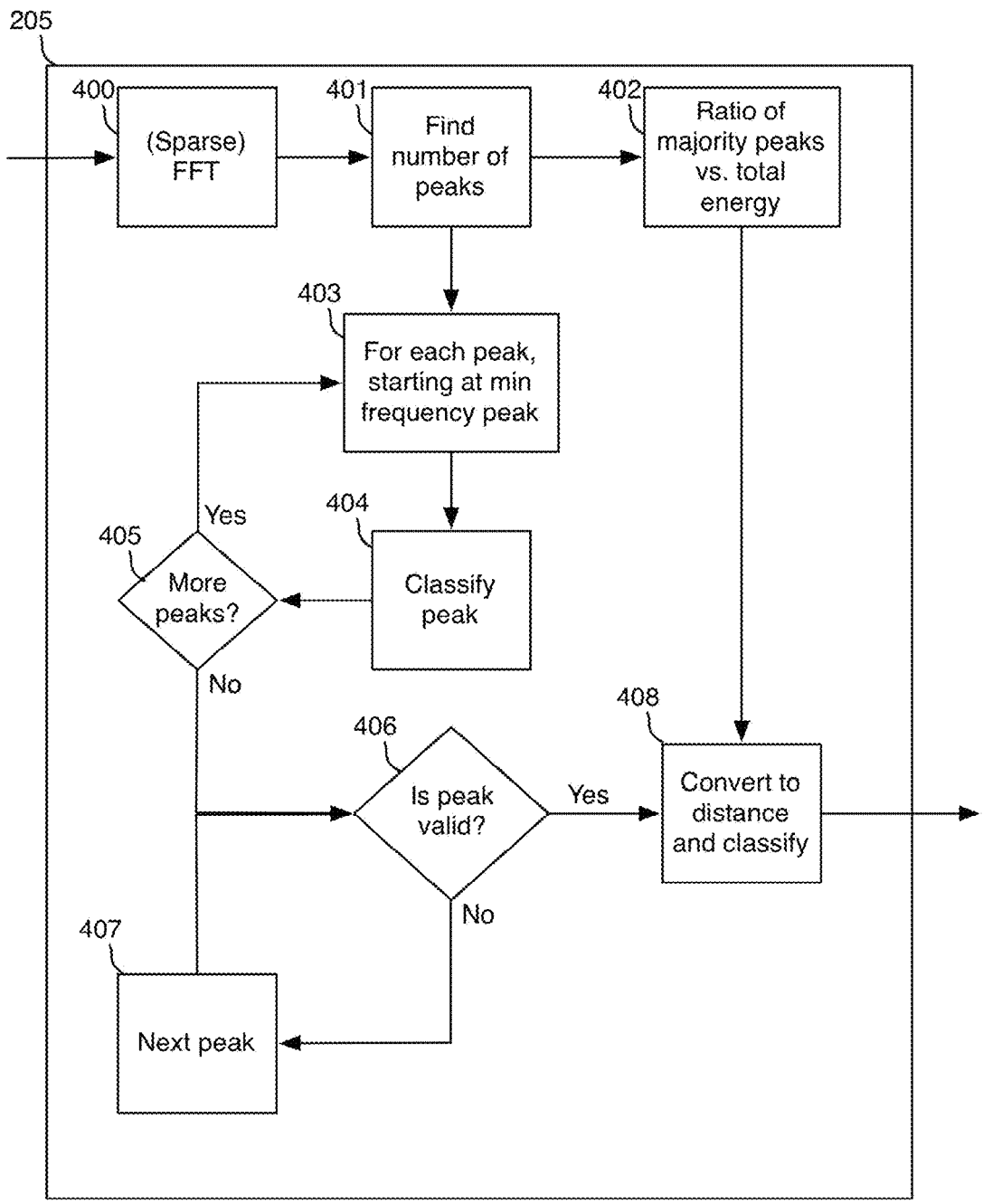
FIG. 4 illustrates a multipath classifier that first calculates a Fast Fourier Transform (FFT) and subsequently finds the peaks in the signal to ultimately generate a multipath classification.

FIG. 4 illustrates an embodiment where a multipath classifier [205] is generated. The processor 103 first calculates a (sparse) FFT [400] before it finds the peaks in the signal. The classifier then iterates through all the found peaks [403] and classifies the found peaks [404]. If no more peaks are available, the ranging system finds the peak with the minimum frequency that is valid [406] before outputting the peak and its classification [408].

In one embodiment, a method is provided for generating and implementing a multipath classifier. A ranging transmitter transmits at least three channels to an active reflecting receiver. A ranging receiver then receives reflected instances of the at least three transmitted channels from the active reflecting receiver. A processor of the system then determines a ranging measurement between the ranging transmitter and the active reflecting receiver based on measured phase changes and received signal strength. The processor further performs an FFT on the phase change measurements to extract frequency components from the measured phases. The frequency components indicate a channel path length between the transmitter and the active reflecting receiver. The processor further assigns a multipath classification to the determined ranging measurement based on the channel path length indicated by the frequency components, where the multipath classification indicates a relative level of accuracy for the determined ranging measurement.

Figure 5:
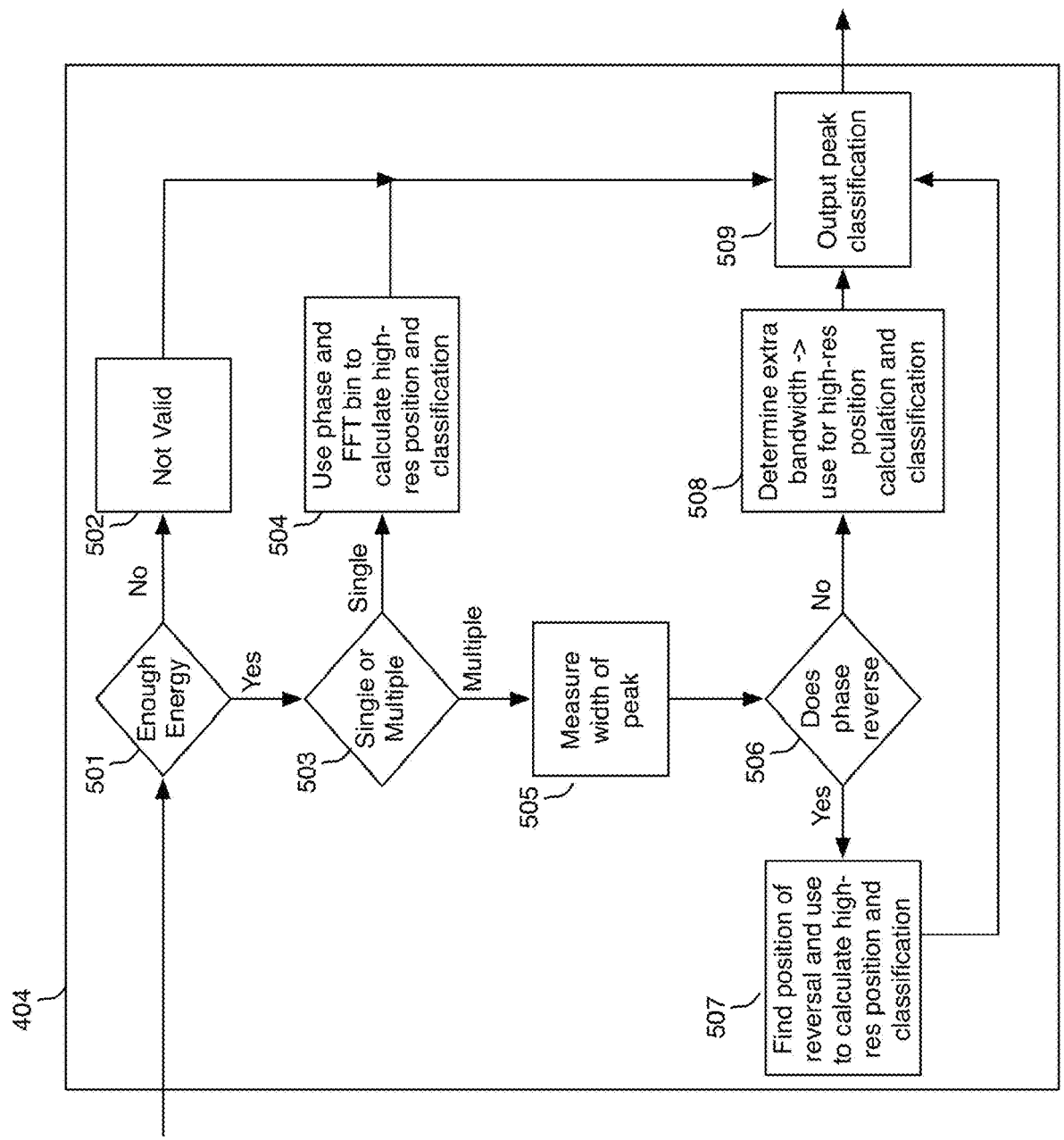
FIG. 5 illustrates a block diagram of a peak classifier.

FIG. 5 illustrates a block diagram of the peak classifier [404]. The ranging system first checks if the peak has enough energy [501] before it checks if the peak is the merger of multiple close together peaks [503]. If it is a single peak, then the ranging system calculates the high-resolution position based off of the FFT bin of the peak and the phase information of the FFT output. If it is multiple peaks, the ranging system measures the width of the peaks [505] and checks if the FFT phase output reverses over the course of the width of the peak. If this is the case, then the ranging system uses that reversal point to calculate a high-resolution position and classification [507]. If not, then the ranging system calculates the excess bandwidth compared to our radio bandwidth and use this information in [508] to calculate the position and classification.

In some cases, the FFT performed on the phase change measurements is a sparse FFT. The sparse FFT is an FFT performed over a finer granularity of phase measurements, but it does not need all measurements to be made. Thus, instead of performing an FFT over, for example, 64 measurements spaced at 1 MHz intervals, the sparse FFT performs the calculation over 128 measurements spaced at 0.5 MHz, but only 64 randomly chosen measurements of the 128 slots get actually filled out. The others are set to 0. The advantage of the sparse FFT over the FFT is that a higher resolution is obtained, and thus higher accuracy, even though the system makes the same number of measurements. The sparse FFT the FFT provides an indication of bins and peaks indicating the intervals where energy is being received from the active reflecting receiver. The multipath classification thus provides a classification to the peaks in the extracted frequency components, indicating how accurate the peak information is.

Figure 7A:
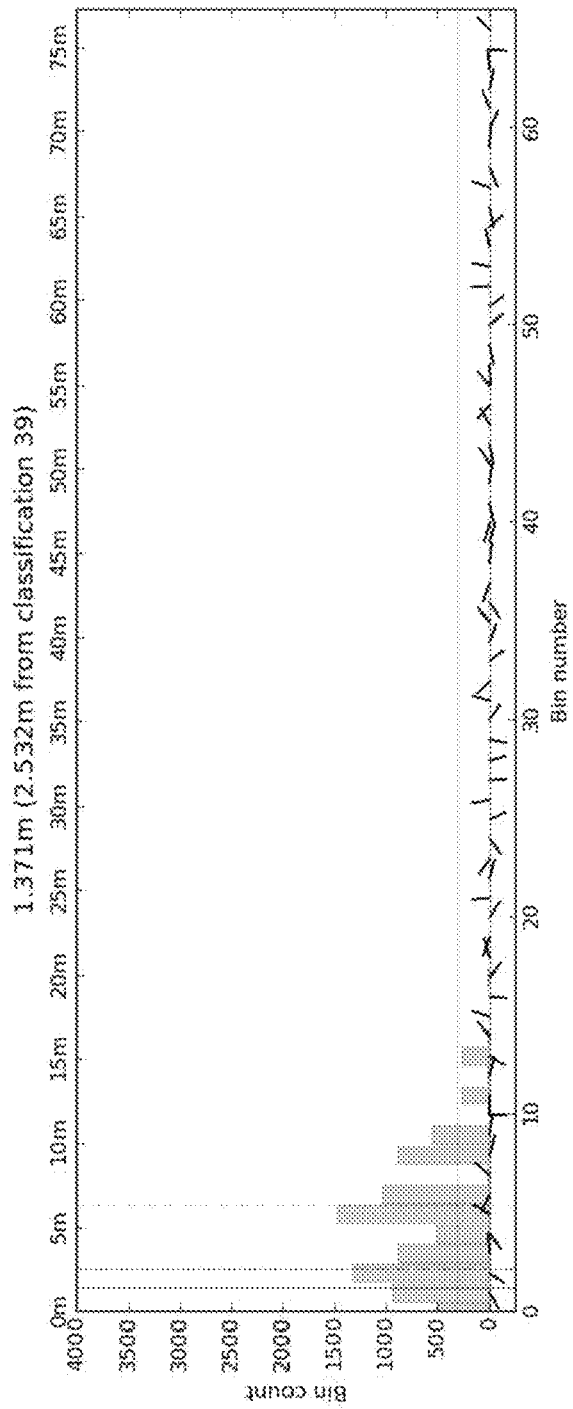
FIG. 7A illustrates a bin count versus bin number graph and FIG. 7B illustrates a phase plot of an embodiment of a multi-path channel where the phase measurements are non-linear.
Figure 7B:
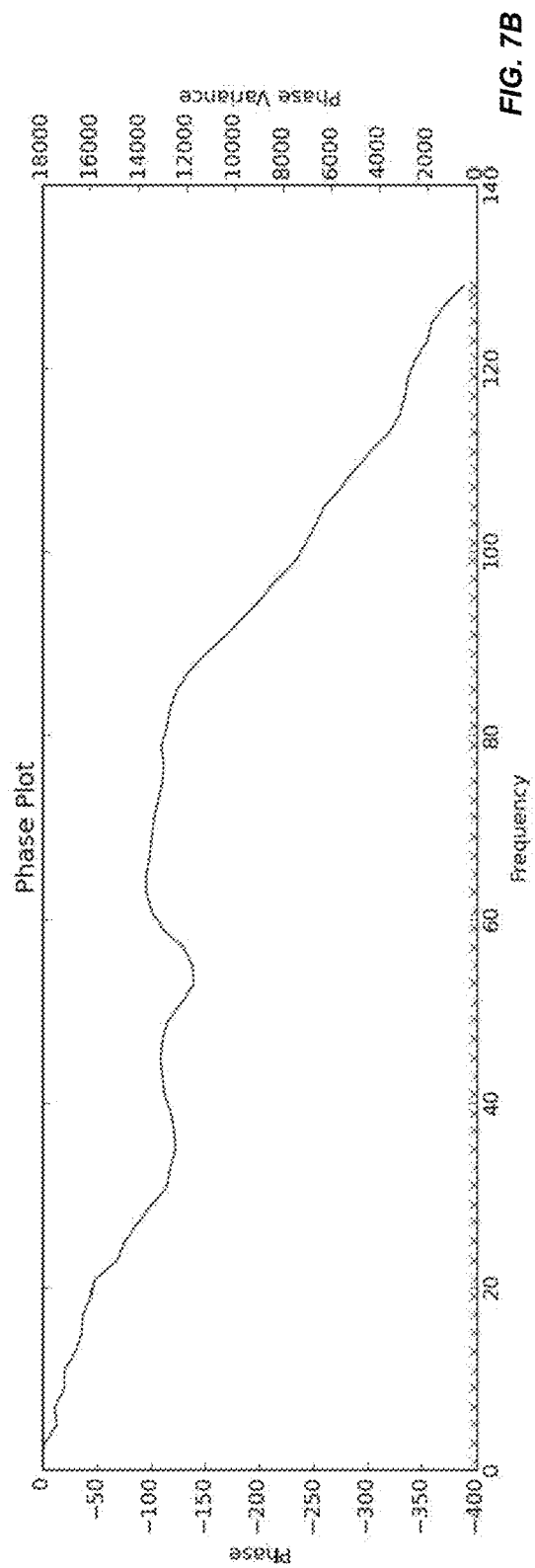

The results of the (sparse or regular) FFT are applied to a multi-path time-domain to generate a phase plot such as that shown in FIG. 7B. FIG. 7A illustrates a bin count versus bin number graph associated with the phase plot of FIG. 7B. The shape and number of peaks detected in the plot are used to derive the multipath classification. In some cases, filters may be implemented to filter out lesser peaks that only represent noise. The energy of the peaks may be added together and compared to the energy of the signal in the other bins. This ratio of peak energy to the total energy may provide a stronger indication that a peak truly is a peak representative of a direct signal path, as opposed to being a reflection. Thus, in this manner, the multipath classification may be based on a ratio of the total energy received compared to the energy in each detected peak.

Figure 6A:
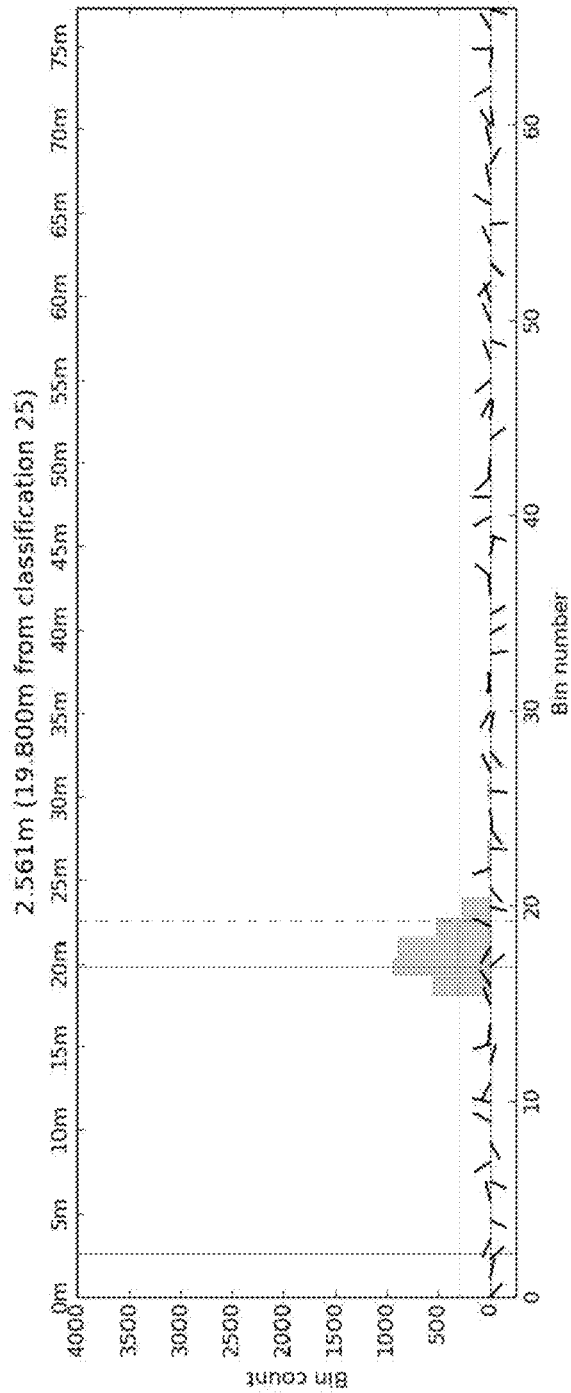
FIG. 6A illustrates a bin count versus bin number graph and FIG. 6B illustrates a phase plot of a measured channel that has a high degree of linearity.
Figure 6B:
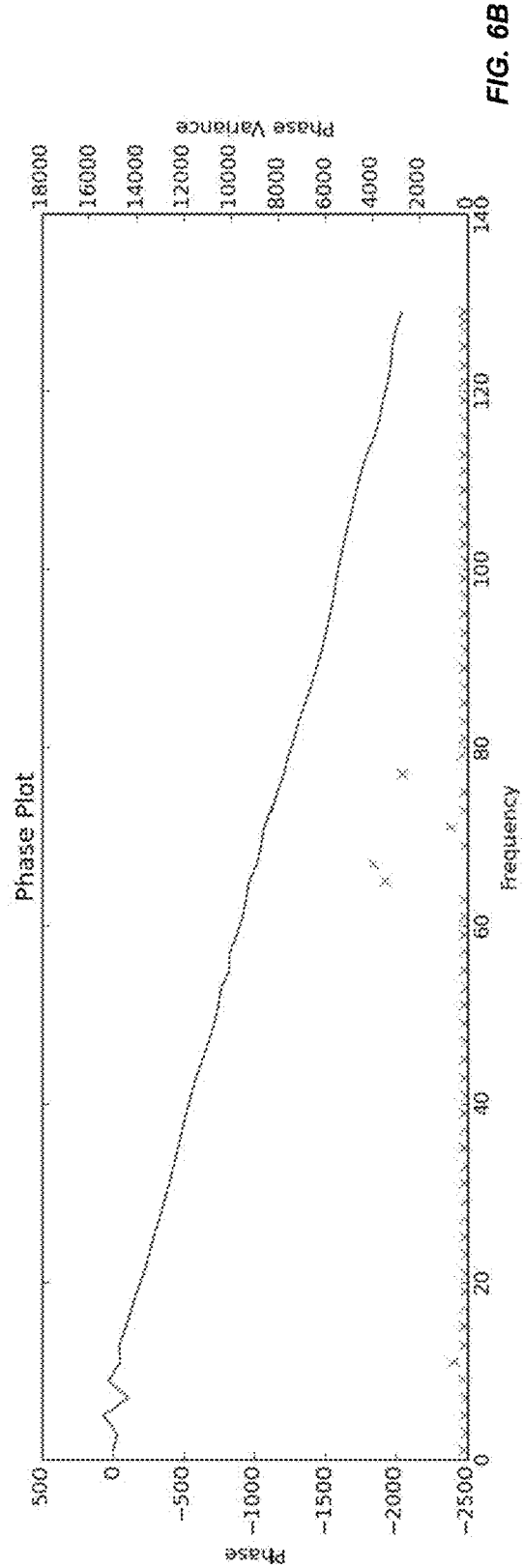

As mentioned above, FIG. 6B illustrates an embodiment of a phase plot of the measured channel while FIG. 6A illustrates a bin count versus bin number graph associated with the phase plot of FIG. 6B. This is a good channel with only one path. As such, the measured phase increments linearly. The degree of linearity is a good indicator of how accurate our measurement is. This would be classified as an extremely good channel with high confidence in the measurement and low error.

Figure 8A:
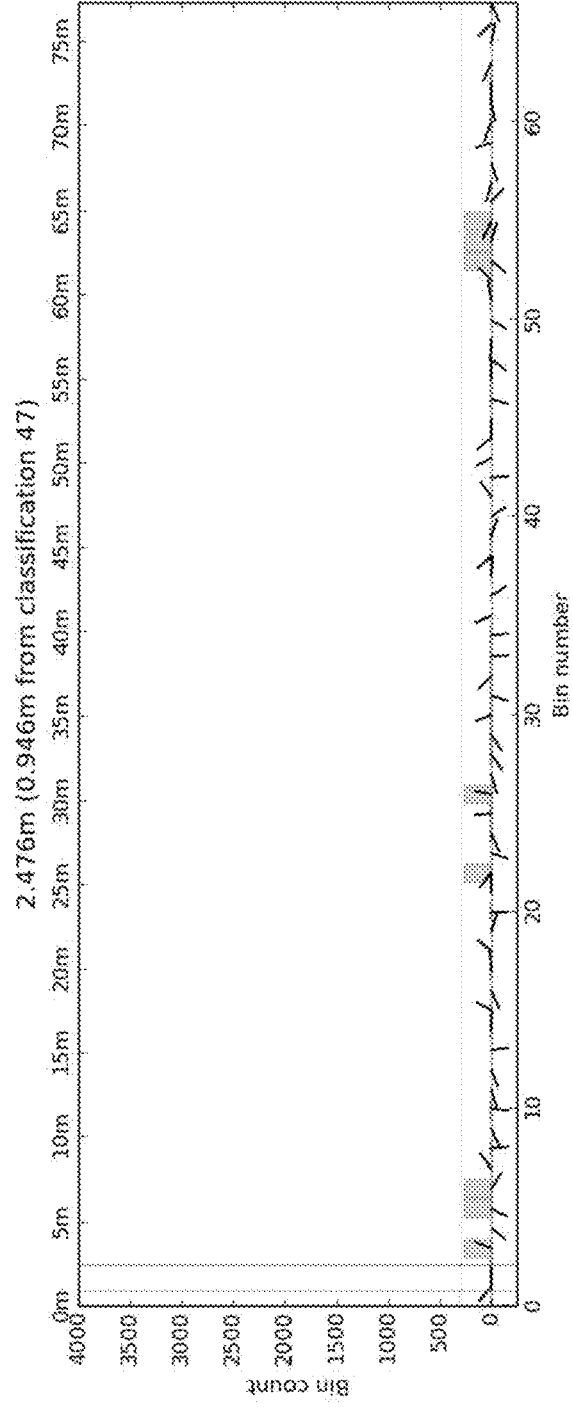
FIG. 8A illustrates a bin count versus bin number graph and FIG. 8B illustrates a phase plot of an embodiment of a multi-path channel where the measured phase variance is very high, and the phase jumps around.
Figure 8B:
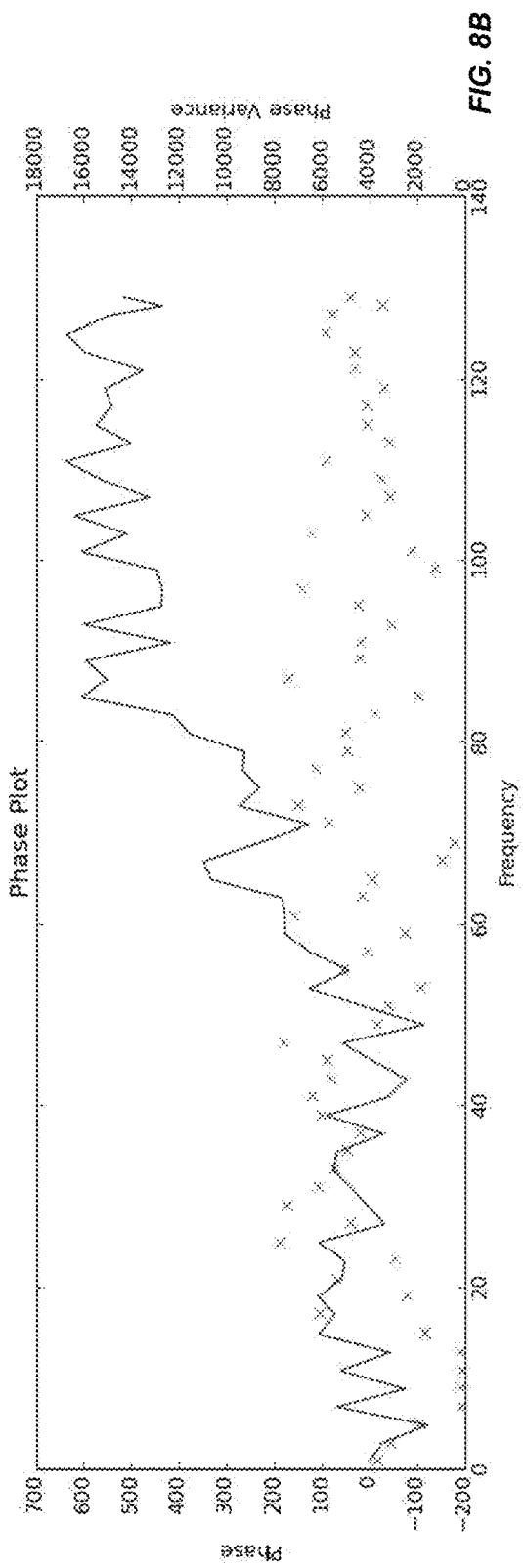

FIG. 7B illustrates an embodiment of a multipath channel. The phase measurements may be non-linear increments. Thus, the multipath classification is based on the number of detected paths, their width, and the difference in energies between the peaks. This would be classified as a good multipath channel with medium confidence and medium measurement error. FIG. 8B represents an embodiment of a phase plot of a bad channel while FIG. 8A illustrates a bin count versus bin number graph associated with the phase plot of FIG. 8B. The measured phase variance is very high, and the phase jumps around. This would be classified as a bad channel with very low confidence assigned.

In the case of a multipath scenario, taking the FFT of the measured phases will reveal the different frequency components contained in the signal. These different components directly correspond to the path length the signals took between the two devices. Thus, properly identifying those components, and taking the shortest one of them will result in the correct distance.

In some cases, if the paths are too close in distance, the peaks may start to clump together. As such, it may be difficult to differentiate between the peaks. Thus, a classifier for multipath channels has to follow roughly the following sequence, as depicted on FIG. 4: first calculate a possible sparse FFT [400] and find the peaks in the result [401], iterate through all the found peaks [403] and classify them [404]; if no more peaks are available [405], the ranging system finds the peak with the minimum frequency that is valid [406] before outputting the peak and its classification [408]. If the peak is not valid [406], the next peak [407] is evaluated [406]. In one example, after finding the number of peaks [401], a ratio of a majority of the peaks vs. total energy is determined [402] and this information can be converted to a distance and classified [408].

Thus, it becomes very useful to classify the different peaks. An example of this classification is depicted on FIG. 5: the system first checks if the peak has enough energy [501] and is above the noise floor before checking if the peak is the merger of multiple close together peaks [503]; if it is a single peak, then the ranging system calculates the high-resolution position based off of the FFT bin of the peak and the phase information of the FFT output [504] and output the peak classification [509]. If multiple peaks exist, the ranging system measures the width of the peaks [505] and determines if the FFT output reverses [506] the phase over the course of the width of the peak. If this is the case, then the ranging system uses that reversal point to calculate a high-resolution position and classification [507]. If not, then the ranging system calculates the excess bandwidth compared to our measurement bandwidth and use this information in [508] to calculate the position and classification and output the peak classification [509].

In some embodiments, all phases are referenced to the phase at the lowest frequency in the FFT. Thus, the phase at the lowest frequency that is the input to the FFT is now zero.

The FFT output for each bin has both real and imaginary components, and thus we can calculate both an angle and a magnitude. In general, the angle is meaningless since in general, the phase of the first frequency is non-zero. However, because the phase of the first signal in this embodiment is always zero, when performing the FFT, the phase relationship of the output bins is predictable. For example, each output bin of the FFT represents 1.1 meters in real distance, resulting in a 1.1 meter resolution if only the bin's magnitude is evaluated as is usually the case. Assuming now that the center of the output bins are spaced at 1.1 meters, if the output signal, for example, is 90 degrees coming out of the FFT, the signal would be 50% over in the bin (or 50% off center), i.e. at 0.55 meters off the center. In general, the phase of each bin should point towards the actual peak. Thus, assuming that the real peak is at 1.1 meters+0.55 meters, the second bin's phase would point to 2.2 meters−0.55 meters, and thus the phase would go from pointing to the right, to pointing to the left, i.e. the sign reverses (506). However, if there are two paths within one bin, or within two adjacent bins. This is an indicator for a bad multipath environment. If two paths are, for example, within 20 cm, they may appear to be the same, in one wide peak; alternatively, if within 1.1 meters, the paths would appear in two bins but would have a narrower peak. In both cases, a user may be notified that the distance measurement is accurate to within 20 cm with a classification of 10.

It should be noted that this is only an example classifier and other mathematical tools could be used to differentiate between the different peaks. Once a peak is found, use it's FFT bin and the resulting phase to calculate a high-precision distance that is more accurate then just the bin itself. The accuracy is classified by the shape of the peak, number of other peaks, and energy in the peak. The classification can then be used by higher level algorithms to improve their weighting of this particular measurement.

Usage of the Classifier to Optimize Ranging

The measurement classification can be used to influence the ranging procedure itself. For example the ranging system may vary the number of frequencies the ranging system measures, the delta between those frequencies, as well as the number of measurements the ranging system has to take per frequency. This can speed up a range measurement by measuring fewer frequencies, or make them more accurate by increasing the number of measurements. One embodiment of this invention implements sparse FFTs to calculate the multi-path bins. The sparse FFT has the property that elements can be left empty (set to 0) if they are not measured. The output of such a sparse FFT will have less resolution, but in cases where the channel is good, it is not necessary to have the full resolution anyway. It also has the advantage that not all phase measurements need to be successful, and bad measurements could be left out of the FFT operation (for example if their variance was too high due to interference on that particular frequency). Thus the combination of the sparse FFT together with the classifier and the underlying ranging method significantly improves the quality of achievable ranging measurements, with an improved confidence on the accuracy.

The radios 100, 101 and the processing unit 103 may include various hardware, but is not limited to one or more antennas, a processor or other computing device, memory, a housing, an oscillator, a phase locked loop, and other components of a device that is capable of transmitting and or receiving a signal.

The processing unit 103, for example, may include hardware and/or software components to validate phase and amplitude of a signal and one or more classifiers that may operate in parallel. The decision or fusion unit 206 can generate an output of the ranging procedure. For example, the Least squares error may be computed in software and/or hardware.

In one example, a classification may not generate a measurement. However, every measurement usually receives a classification. Generally, embodiments of the invention may generate an output that corresponds to a measurement of a distance. The radio 100, by way of example only, may output a measurement of the distance to the radio 101 or to another device or radio. Embodiments of the invention may output an angle, a distance, a location or the like and each of these receives a classification. A classification can be based on various characteristics of the signals including the peaks, the width of the peaks or phase information or the like.

For example, each could be classified with a number within a range of numbers (e.g., 1-100). A 1 represents a good measurement and a 100 represents a measurement that is not really usable since the system may be unsure of the accuracy. Another classification could be a standard deviation associated with every measurement. For example, if the system or device determines that the quality of the measurement is good, the measurement may be within a standard deviation (e.g., plus or minus some unit). If the system or device, then the measurement may have a different result. By way of example only, a good measurement may be classified as within plus or minus 1 cm, 10, cm (or smaller or larger) while a poor or unsure measurement may be plus or mine 3 meters (or x meters or other unit).

The systems and methods discussed herein can classify the measurements and output measurements. Embodiments relate to a method of classifying a group of radio frequency channels between one or more ranging transmitter and receiver pairs or pairs of transceivers (the foregoing are examples of the radios 100 and 101). This may include sending and receiving signals, processing the signals as discussed herein, identifying peaks, and generating measurement and classifications of the measurements. The method and system may therefore involve multiple pairs of radios.

Classifying the measurements enables a user (or the devices themselves) to refine the number of channels and measurements taken at each channel. Refining in this manner can improve the measurement frequency in good channels by removing unnecessary ones. Alternatively, accuracy in bad channels can be improved by adding measurements.

The ranging system can change frequency of transmitter and the phase that comes back is correlated to the distance of the active reflector to the transmitter—based on the wavelength of the frequency—that's how the ranging system gets the frequencies—phase depends on phase length and the distance, so by changing the wavelength or frequency, you can determine the distance It will be understood by those having skill in the art that many changes may be made to the details of the above-described embodiments without departing from the underlying principles of the invention. The scope of the present invention should, therefore, be determined by the following claims.

What is claimed is:

1. A method of classifying a group of radio frequency (RF) transmissions between a ranging device including a ranging transmitter or a ranging receiver and an active reflecting device including an active reflecting receiver and an active reflecting transmitter to find a location, angle, or distance between the ranging device and the active reflecting device, the method comprising:

transmitting, by the ranging transmitter, at least three signals on at least three channels to the active reflecting receiver;

receiving, by the ranging receiver, reflected signals of the at least three transmitted signals from the active reflecting receiver, wherein the active reflecting receiver receives the at least three signals, actively matches phases and frequencies of the at least three signals;

transmitting, by the active reflecting transmitter, the reflected signals to the ranging receiver;

measuring phase changes and received signal strengths of the reflected signals;

extracting frequency components from the measured phase changes, wherein the frequency components correspond to a plurality of paths between the ranging transmitter and the active reflecting receiver;

determining a location, angle, or distance measurement between the ranging transmitter and the active reflecting receiver for each of the plurality of paths; and assigning a classification to the determined location, angle, or distance measurement for each of the plurality of paths through a combination of both linearity classification and multipath classification to indicate a relative level of accuracy for the determined location, angle, or distance measurement for each of the plurality of paths.

2. The method of claim 1, wherein the linearity classification being determined by plotting phase measurements of the reflected signals and determining a degree of linearity for the plotted phase measurements.

3. The method of claim 1, wherein the multipath classification being determined by performing a Fast Fourier Transform (FFT) on the phase change measurements to extract the frequency components from the measured phases, wherein the frequency components indicate a channel path length between the ranging device and the active reflecting device.

4. The method of claim 1, wherein the assigned classification comprises a number within a range of numbers where a first number indicates that the classification is accurate and where a second number indicates that the classification is inaccurate.

5. The method of claim 1, further comprising performing a phase and amplitude validation on the reflected signals received from the active reflecting transmitter to measure the phase changes and the received signal strength in the at least three signals.

6. The method of claim 1, wherein the assigned classification allows channels to be improved or removed from consideration when determining the ranging measurement.

7. The method of claim 1, wherein a specified pool of frequencies is available for use.

8. The method of claim 7, wherein continuous signals are implemented from the pool of frequencies.

9. The method of claim 7, wherein the transmitter hops between a plurality of different frequencies selected from the pool of frequencies.

10. A method of classifying a group of radio frequency (RF) channels between a ranging device including a ranging transmitter or a ranging receiver and an active reflecting device including an active reflecting receiver and an active reflecting transmitter, the method comprising:

transmitting, by the ranging transmitter, at least three signals to the active reflecting receiver;

receiving, by the ranging receiver, reflected signals of the at least three transmitted channels from the active reflecting transmitter;

determining a ranging measurement between the ranging transmitter and the active reflecting receiver based on measured phase changes and received signal strength;

plotting phase measurements of the reflected instances of the at least three channels for each frequency of the at least three channels;

extracting frequency components from the measured phase changes, wherein the frequency components correspond to a plurality of paths between the ranging device and the active reflecting receiver; and assigning a classification to the determined ranging measurement for each of the plurality of paths through a combination of both linearity classification and multipath classification to indicate based on the phase and frequency of the at least three channels, the classification indicating a relative level of accuracy for the determined ranging measurement for each of the plurality of paths.

11. The method of claim 10, further comprising performing a plurality of phase measurement samples at each frequency.

12. The method of claim 11, further comprising determining a variance in the plurality of phase measurement samples for each frequency, where the variance in the plurality of phase measurements at each frequency is related to an accuracy of the plurality of phase measurements.

13. The method of claim 10, further comprising, determining a degree of linearity for the plotted phase measurements at specified frequencies, wherein the degree of linearity is determined using a least squares method or a line fit method.

14. A method of classifying a group of radio frequency (RF) channels between a ranging device including a ranging transmitter and a ranging receiver and an active reflecting device including an active reflecting receiver and an active reflecting transmitter, the method comprising:

transmitting, by the ranging transmitter, at least three signals to the active reflecting receiver;

receiving, by the ranging receiver, reflected signals of the at least three transmitted channels from the active reflecting receiver;

determining a ranging measurement between the ranging transmitter and the active reflecting receiver based on measured phase changes and received signal strength;

performing a Fast Fourier Transform (FFT) on the phase change measurements to extract one or more frequency components from the measured phases, the frequency components indicating a plurality of path lengths between the transmitter and the active reflecting receiver;

assigning a classification to the determined ranging measurement for each of the plurality of paths through a combination of both linearity classification and multipath classification based on a distortion of the frequency components, the classifications indicating a relative level of accuracy for the determined ranging measurement for each of the plurality of paths.

15. The method of claim 14, wherein the FFT performed on the phase change measurements comprises a sparse FFT, the sparse FFT comprising an FFT performed using a subset of randomly chosen phase change measurements.

16. The method of claim 14, wherein the FFT provides an indication of one or more bins and peaks indicating intervals where energy is being received from the active reflecting receiver.

17. The method of claim 16, wherein the multipath classification provides a classification to the peaks in the extracted frequency components.

18. The method of claim 14, wherein the results of the FFT are applied to a multi-path phase plot, such that the shape and number of peaks detected in the phase plot are used to derive the multipath classification.

19. The method of claim 17, wherein the multipath classification is further based on a ratio of total energy received compared to energy in each of the peaks.

* * * * *